Patented Mar. 19, 1935

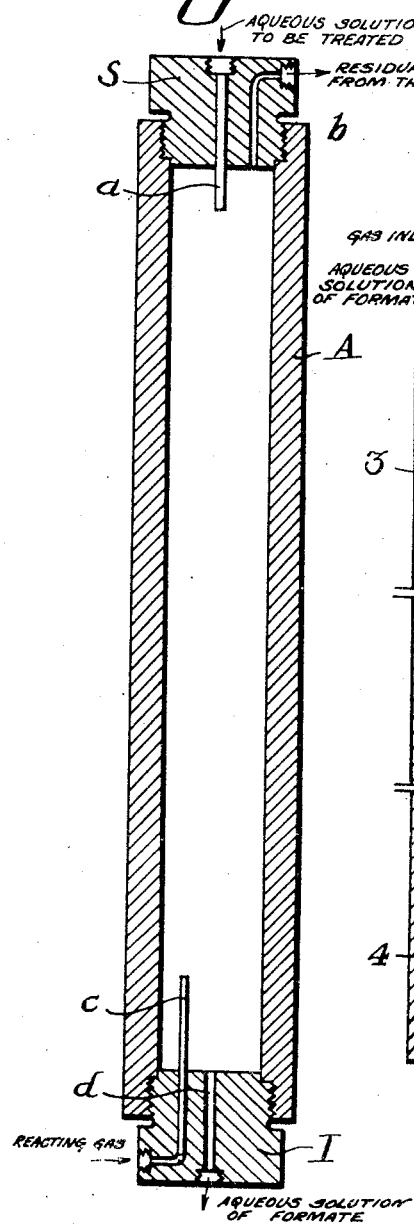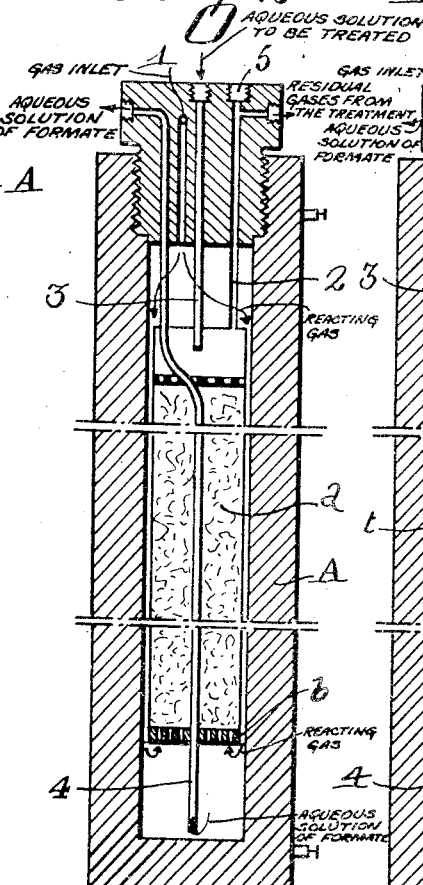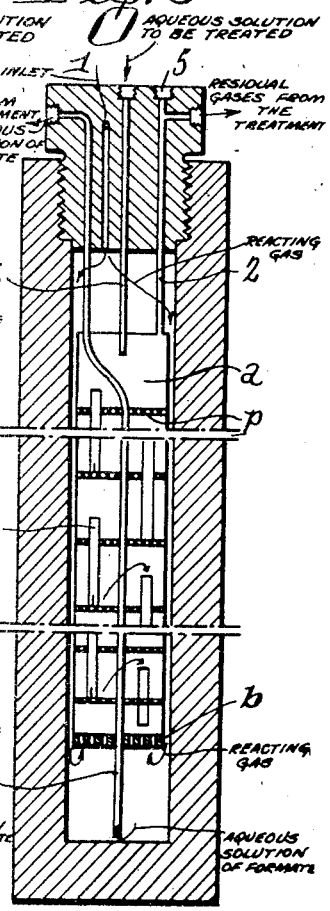

1,995,211

UNITED STATES PATENT OFFICE 1,995,211

PROCESS FOR THE MANUFACTURE OF AMMONIUM AND ALKALI-METAL FORMATES

Andre Leroux, Ramioul, Belgium, assignor to Franco-Belge d'Ougree, Ougree, Belgium, a firm Application March 11, 1931, Serial No. 521,848
In France March 12, 1930

2 Claims. (Cl. 260—112)

This invention relates to the continuous manufacture of alkali-metal and ammonium formates in aqueous solution, under pressure and at high temperature. For brevity's sake, the aqueous solutions in which the reactions take place are named "solutions" and not "aqueous solutions" in the following throughout the whole specification.

A first way of carrying out this process consists in treating a solution of an alkali-metal bicarbonate or of ammonium bicarbonate with hydrogen or a gaseous mixture containing the same in the presence of a catalyzer at a temperature little lower than the critical temperature of the solution, for instance 250° and above, under a pressure of steam sufficient for maintaining the liquid state and a considerable pressure of hydrogen, at least 50 atmospheres. Under these conditions, the reaction is remarkably rapid and complete, to such an extent that the reaction may be carried out uninterrupted.

Nickel constitutes an excellent catalyzer for this reaction. Nickel reduced from the oxide obtained by calcining the nitrate may especially be taken. It may be taken alone or disposed upon a neutral carrier, for instance coke.

Another way of manufacturing alkali-metal or ammonium formates consists in treating a solution of an alkali-metal carbonate or bicarbonate or of ammonium carbonate or bicarbonate with carbon monoxide or a gaseous mixture containing same, at a temperature not much under the critical temperature of the solution, for instance 300° C. and above, provided a considerable pressure of carbon monoxide, at least 50 atm., is simultaneously employed. It has been ascertained that, when operating under these conditions, the transformation of the dissolved carbonate or bicarbonate into formate takes place remarkably rapidly and completely, so that, in this case also, it may be carried out continuously. The reaction takes place either with or without a catalyzer. The carbon monoxide may be admixed with an inert gas or hydrogen.

If the reaction is carried out starting from a mixture of carbon monoxide and hydrogen without a catalyzer, only a very small portion of the hydrogen reacts, so that the greater part of the hydrogen is collected in admixture with the carbon dioxide which is evolved during the reaction of the carbon monoxide with the carbonate or bicarbonate. If on the contrary the reaction is carried out in the presence of a catalyzer, such as nickel, which enables the simultaneous reaction of the hydrogen, both the hydrogen and the carbon monoxide react simultaneously.

If the gaseous mixture contains less than 50% carbon monoxide it is of advantage that the reaction temperature be very near the critical temperature of the solution. If on the contrary a gaseous mixture containing more than 50% carbon monoxide is used, it is advisable to remain in the neighbourhood of 300° C. so that the deposit of carbon resulting from the partial decomposition of carbon monoxide into carbon dioxide and carbon may be avoided. This carbon deposit does not prevent the reaction from proceeding on, but is objectionable in that it contaminates the manufactured formate. This objectionable carbon deposit may be moreover avoided in known manner by making the apparatus of suitable material.

If the reaction is carried out without a catalyzer being present, the process enables practically the whole of the carbon monoxide of a mixture of carbon monoxide and hydrogen to be eliminated. It is sufficient to bring the gaseous mixture into contact with an excess of liquid, so as to be sure that all the carbon monoxide is absorbed. The process allows in particular the manufacture of a mixture of nitrogen and hydrogen from water gas, the average composition of which is, as well known, about 50% hydrogen, 40% carbon monoxide, 8% nitrogen and 2% hydrocarbons. After the absorption of carbon monoxide there remains a gaseous mixture which contains hydrogen, nitrogen, carbon dioxide, steam, hydrocarbons, and traces of carbon monoxide. The carbon dioxide and steam are removed in known manner or again a part of the carbon dioxide is utilized for precipitating sodium bicarbonate as hereinafter described. After removal of the hydrocarbons and the traces of carbon monoxide there remains only hydrogen and nitrogen in the volumetric proportion of about 50 parts of hydrogen to 8 parts of nitrogen. The process allows even of the obtention of a gaseous mixture having the proportion of 1 volume of nitrogen to 3 volumes of hydrogen, that is fit for the ammonia synthesis. To this effect it is sufficient to add a suitable quantity of oxygen or air to the water gas with which the carbonate or bicarbonate solution is treated. The oxygen of the air combines to carbon dioxide or steam, and its nitrogen unites with that already contained in the water gas.

The process also enables one to remove from coke oven gas the carbon monoxide contained therein. After removal of the carbon dioxide and steam contained in the outflowing gaseous mixture, there remains a mixture mainly composed of nitrogen, hydrogen and methane which may be treated in a known manner, for instance by partial liquefaction.

Another way of carrying out the process according to the present invention consists in treating at elevated temperature, for instance at a temperature between 200 and 350°, an ammoniacal solution with carbon monoxide or a gaseous mixture containing the same, provided that a considerable pressure of carbon monoxide, preferably at least 50 atmospheres, is employed in this case also. In those conditions the reaction is remarkably rapid and complete. This process also permits of the complete absorption of the carbon monoxide contained in a gaseous mixture.

When the solution resulting from the reaction and brought back to the usual pressure contains both sodium formate and sodium carbonate or bicarbonate, the formate may be separated from the carbonate or bicarbonate in the following manner:

The solution is concentrated, whereby all the bicarbonate is transformed into carbonate, after which the solution is treated in the cold with carbon dioxide, for instance that which evolves during the manufacture of formate. Sodium bicarbonate precipitates thereby whilst the gaseous mixture used for the treatment is freed from a part of its carbon dioxide. The precipitated sodium bicarbonate may be used again as a starting material in the same reaction.

The process may be carried out in any one of the three apparatus which are diagrammatically shown in the appending figures.

On Fig. 1, A is a cylindrical reaction tube. A stopper is screwed at each end. The upper stopper S is provided with two canals. One of them is prolonged by a tube $a$ which penetrates into the reaction tube. It is used for filling the liquid in. The other canal $b$ is used for allowing the outflow of the gas. Again, the lower stopper I is provided with two canals, one of which $d$ is used for evacuating the liquid, and the other $c$, which is prolonged by a tube which penetrates into the reaction tube, for introducing the gas.

On Figs. 2 and 3, four canals which are passing through the only stopper of the container, which is completely closed at its opposite end, are provided for entrance of the liquid and the gas about to react and for the outflow of the liquid and the gas which come from the reaction. The liquid is introduced through 3 and the gas through 1. The liquid flows downwardly inside the internal cartridge $a$, which is, according to the circumstances, filled with a catalyzer or with an inert substance, the role of which is to facilitate an intimate contact between the liquid and the gas. The liquid then flows through the perforated wall which constitutes the bottom of the cartridge, and is evacuated through the pipe 4, which reaches the bottom of the reaction tube. The gas which has been introduced through 1 flows first through the annular space between the external pressure-resisting tube A and the internal cartridge $a$, is warmed up during this indirect contact with the liquid, flows upwardly through the perforated wall which constitutes the bottom of the cartridge, and is evacuated through the canal 2 after having entered into intimate contact with the liquid of the cartridge. On Fig. 3, $p$ and $t$ respectively show perforated trays and vertical tubes the role of which is to facilitate in known way the intimate contact of the liquid with the gas. This intimate contact may also be facilitated by providing for a device which sprays the liquid.

*Example 1.*—I prepare a solution saturated with sodium bicarbonate at a temperature little lower than that at which carbon dioxide would evolve from the solution. Such a solution contains approximately 70 to 80 grams of sodium bicarbonate per litre. I treat this solution at a temperature of about 300° C. with a gas containing 95% hydrogen in the presence of reduced nickel deposited upon coke. The adopted total reaction pressure (the pressure of the steam plus the pressure of the hydrogen) is about 300 atm. The length of the space occupied by the catalyzer is 60 centimeters. The solution resulting from one passage through the catalyzer contains 30 to 40 grams of sodium formate.

*Example 2.*—In one of the above described apparatus a gaseous mixture containing 75% carbon monoxide is caused to bubble through a solution containing 180 grams sodium bicarbonate per litre. The temperature is about 300° C. the pressure 250 atm.; the time of reaction is 10 minutes. The solution which flows out of the reaction tube contains 100–150 grams sodium formate per litre.

*Example 3.*—A solution containing 220 grams of sodium carbonate per litre is circulated downwardly in a reaction tube, which is 70 centimeters long and is filled with inert material. Water gas containing 43 per cent carbon monoxide and 45 per cent hydrogen is circulated upwardly in counter-current of the liquid. The temperature is 335° C., the pressure 500 atm. No catalyzer is utilized. The gaseous mixture is taken in excess, so as to transform substantially all the carbonate in formate. The gas leaving the reaction chamber contains but half the carbon monoxide which was contained in the initial gas. It contains 10% more hydrogen than was contained in the initial gas, and 10% more carbon dioxide than would be produced, should not an auxiliary reaction, viz. that of carbon monoxide with steam, take place in a certain extent simultaneously with the reaction of the formation of the formate.

*Example 4.*—A gas containing 75% carbon monoxide is caused to bubble through an ammoniacal solution. The temperature is 250° C., the pressure 200 atm. The resulting solution contains a quantity of ammonium formate which approximates 130 grams per litre.

I claim:

1. In the process for the manufacture of formates by treating with hydrogen in the presence of a catalyst an aqueous solution of a bicarbonate of a member of the group consisting of alkali-metals and ammonium, the feature of carrying out the reaction at a temperature between 250° C. and the critical temperature of the solution, under a pressure of steam sufficient for maintaining the liquid state and a pressure of hydrogen of at least 50 atmospheres.

2. A process for the manufacture of the formate of a member of the group consisting of alkali-metals and ammonium which consists in treating an aqueous solution of a bicarbonate of a member of the aforesaid group.

ANDRE LEROUX.